(No Model.)
7 Sheets—Sheet 2.
W. F. NEDLER.
FARE INDICATING DEVICE FOR VEHICLES.
No. 383,758. Patented May 29, 1888.
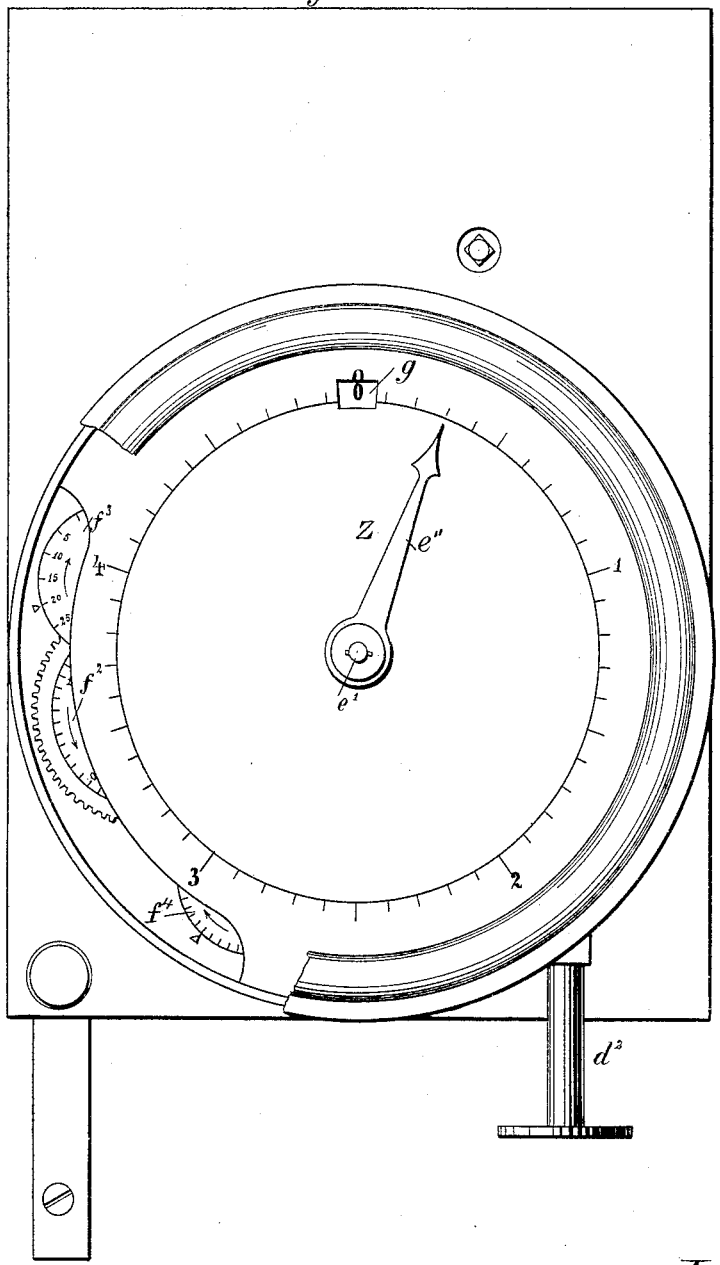
Fig. 1ª.
Witnesses:
C. S. Beer
H. G. Rogers
Inventor:
Wilhelm F. Nedler.
By Paine & Lord
Atty's.

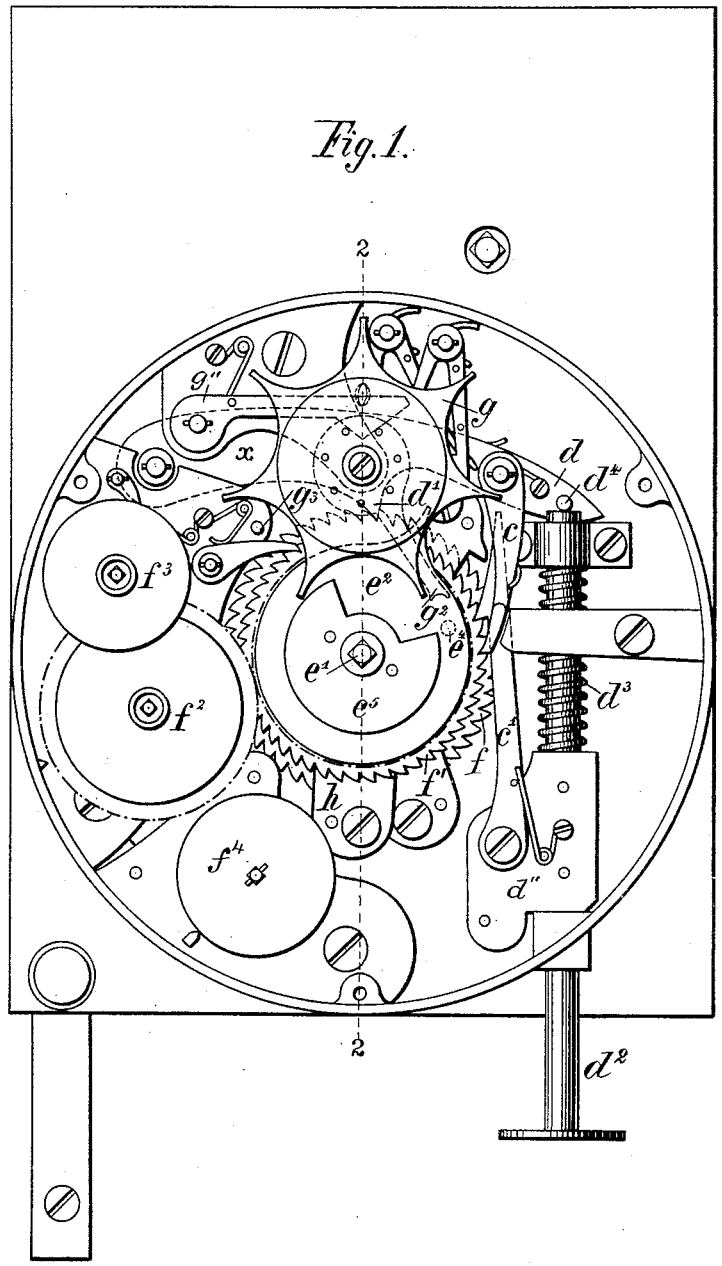

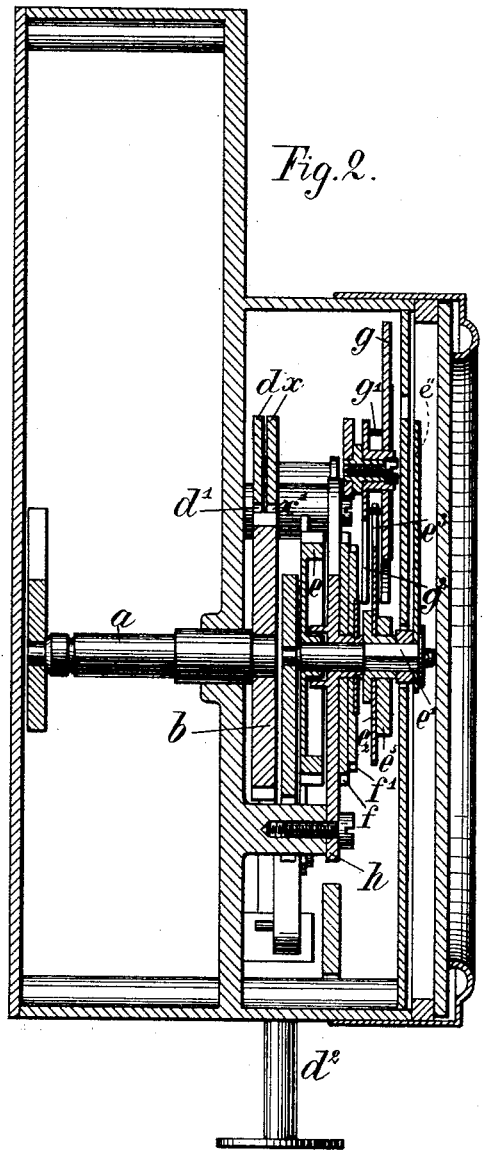

(No Model.) 7 Sheets—Sheet 4.

W. F. NEDLER.
FARE INDICATING DEVICE FOR VEHICLES.

No. 383,758. Patented May 29, 1888.

Witnesses:
C. T. Beer
H. G. Rogers.

Inventor:
Wilhelm F. Nedler.
By Paine & Ladd,
Atty's.

(No Model.) 7 Sheets—Sheet 5.

W. F. NEDLER.
FARE INDICATING DEVICE FOR VEHICLES.

No. 383,758. Patented May 29, 1888.

Witnesses:
C. J. Beer
H. G. Rogers

Inventor:
Wilhelm F. Nedler.
By Paine & Ladd,
Atty's.

(No Model.) 7 Sheets—Sheet 6.
W. F. NEDLER.
FARE INDICATING DEVICE FOR VEHICLES.

No. 383,758. Patented May 29, 1888.

Witnesses:
C. T. Beer
H. G. Rogers

Inventor:
Wilhem F. Nedler
By Paine & Son,
Atty's.

(No Model.) 7 Sheets—Sheet 7.

W. F. NEDLER.
FARE INDICATING DEVICE FOR VEHICLES.

No. 383,758. Patented May 29, 1888.

Witnesses:
C. J. Beer
A. G. Rogers

Inventor:
Wilhelm F. Nedler
By Payne & Lord,
Atty's.

UNITED STATES PATENT OFFICE.

WILHELM FRIEDRICH NEDLER, OF HAMBURG, GERMANY.

FARE-INDICATING DEVICE FOR VEHICLES.

SPECIFICATION forming part of Letters Patent No. 383,758, dated May 29, 1888.

Application filed January 5, 1888. Serial No. 259,822. (No model.) Patented in Belgium February 21, 1887, No. 76,437.

*To all whom it may concern:*

Be it known that I, WILHELM FRIEDRICH NEDLER, a subject of the Emperor of Germany, and a resident of Hamburg, in the German Empire, have invented certain new and useful Improvements in Fare-Indicating Apparatus for Cabs and other Vehicles, of which the following is a specification.

My invention (for which I have obtained Letters Patent in Belgium, No. 76,437, dated February 21, 1887) relates to improvements in apparatus for automatically indicating the fare due on a cab or other public conveyance, according to time or distance; and the objects of these improvements consist, first, in the provision of a fare-indicator with a dial-plate upon which the fare to be paid for each hiring is indicated, in order that when the hand of the indicator has passed around the whole or part of the circumference of the dial a number corresponding to the distance passed through presents itself opposite an opening, and serves for the calculation of the fare independently of the motion of the indicating-hand; and, second, of means for indicating upon the dial the minimum fare which must be paid for hire, no matter whether the corresponding distance or duration of time has been attained or not. I attain these objects by the mechanism illustrated in the accompanying drawings, in which—

Figure 3:
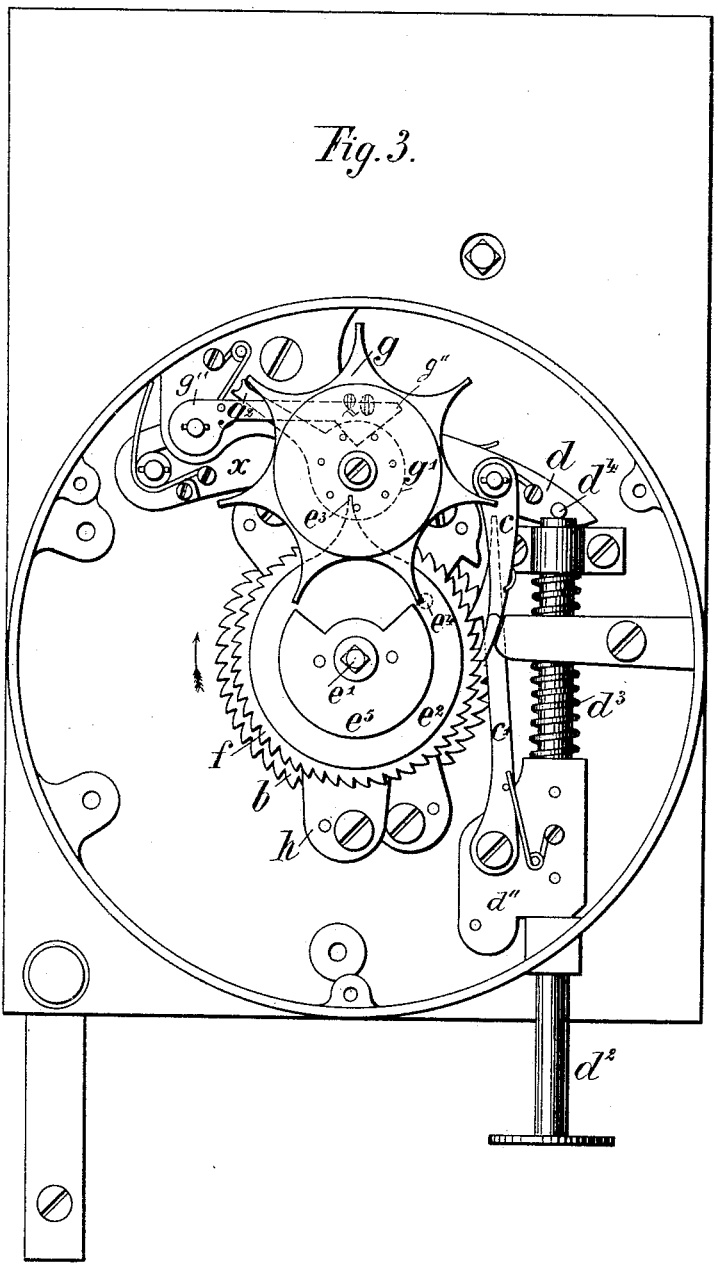
Figure 4:
Figure 5:
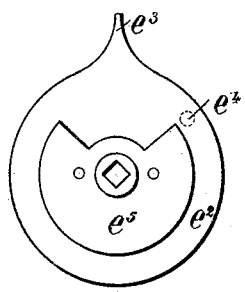
Figure 6:
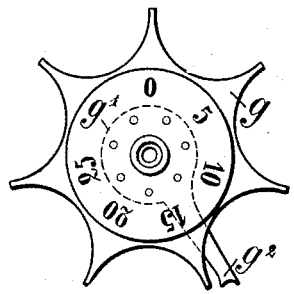
Figure 7:
Figure 8:
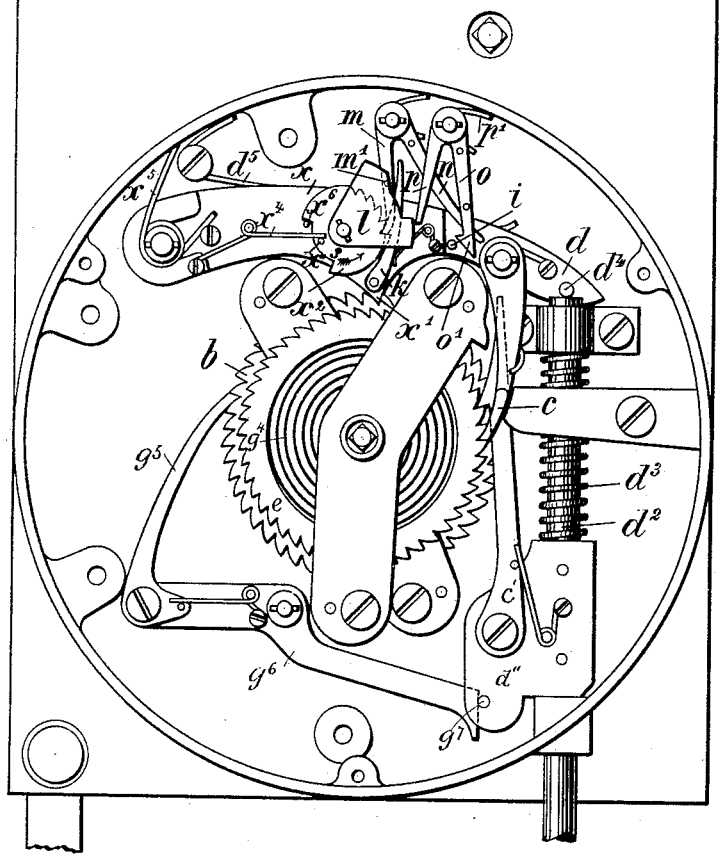
Figure 9:
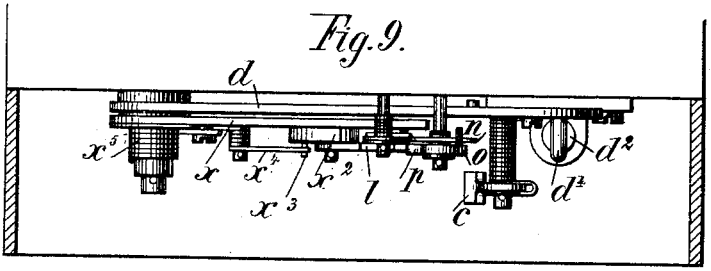
Figure 10:
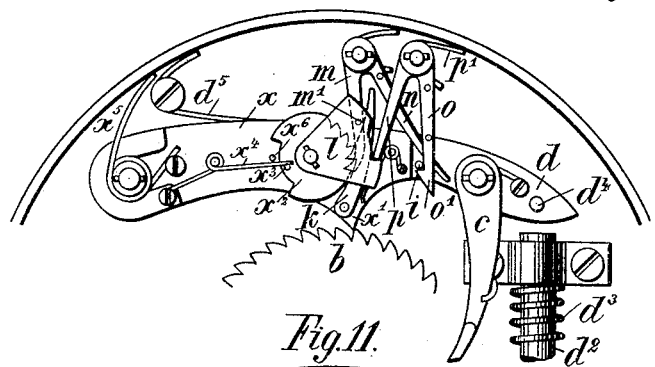
Figure 11:
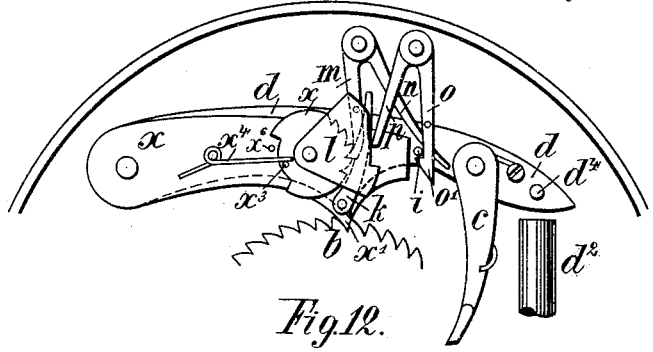
Figure 12:
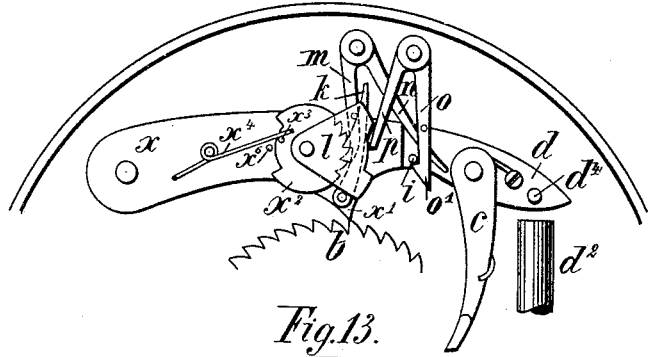
Figure 13:
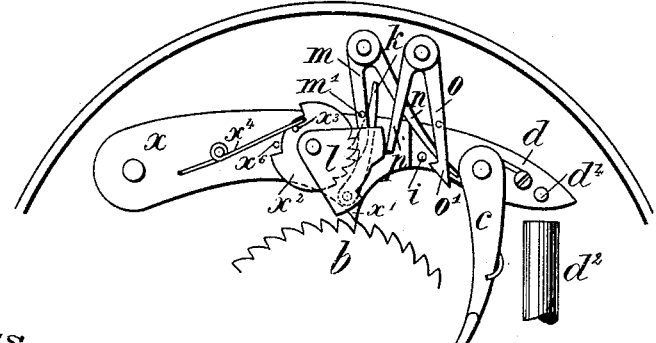

Figure 1 is a front view of the apparatus, the hand and the dial-plate removed. Fig. 1ª is a front view of the apparatus, showing the hand and dial-plate and the wheels indicating the total amount received by the cabman. Fig. 2 is a cross-section of the apparatus on the line 2 2, Fig. 1. Fig. 3 is a front view of the same with some parts omitted. Figs. 4 and 5 are side and front views, respectively, of the cam and its notched disk. Figs. 6 and 7 are front and side views, respectively, of the indicating star-wheel. Fig. 8 is a front view, similar to Fig. 1, with parts removed. Fig. 9 is a plan view thereof, with parts in section; and Figs. 10 to 13, inclusive, are detail views showing steps in the operation of the auxiliary mechanism.

Similar letters refer to similar parts throughout the several views.

According to the first part of the said invention, the main shaft $a$, Fig. 2, of the apparatus is operated by clock-work, for charging by time, or from a wheel of the vehicle, for charging by distance, neither of which means is shown, as the same form no part of my invention. A ratchet-wheel, $b$, is fixed upon the shaft $a$, and causes the lever $d$, which engages therewith by means of a projection, $d'$, (see Fig. 1,) to oscillate upon its pivot. Through the medium of a pawl, $c$, suspended from the lever $d$, two ratchet-wheels, $e$ $f$, (see Fig. 2,) of equal diameter and having an equal number of teeth, are rotated. The rear ratchet-wheel, $e$, is rigidly connected with the shaft $e'$, which carries the hand $e''$, and is supported in a back plate, $h$. The front ratchet-wheel, $f$, moves loosely upon a sleeve projecting from the plate $h$. The ratchet-wheel $f$ is connected with a toothed wheel, $f'$, which operates the wheels $f^2$ $f^3$ of the dial mechanism. (See Fig. 1ª.)

The wheels $f^2$ $f^3$ of the dial mechanism are designed to intermesh, and are secured adjacent each other, back of an opening in the dial, as shown, and are provided on their faces with suitable numerals for calculation. A third wheel, $f^4$, is generally used in connection with the wheels $f^2$ $f^3$.

Upon the front part of the hand-shaft $e'$, which is square, is placed a cam, $e^3$, Figs. 3, 4, and 5, the projection $e^3$ of which engages with the pinion $g'$ of the star-wheel $g$, Figs. 1, 3, 6, and 7. On the surface of the star-wheel $g$ are placed numbers which serve for indicating the amount of fare, (in the apparatus illustrated in the accompanying drawings the figures 0, 5, 10, 15, 20, and 25.) The cam projection $e^3$, having engaged a pin of the pinion $g'$, Fig. 3, turns the latter forward a distance equal to one tooth during the next displacement of the hand. A spring-pawl, $g''$, materially assists the rapid movement of the star-wheel by means of the special shape of its nose, which will bring the pinion $g'$ into the right position and fix it there as soon as the respective pin of the pinion $g'$ has passed the nose of the pawl $g''$. The ratchet-wheel $e$ has, however, also for its object to return the dial mechanism to the zero position, after the hiring is ascertained, without affecting the operating mechanism. For this purpose the ratchet-wheel $e$ is arranged as a spring-box, which during its movement coils a spring, $g^4$, inserted therein. The said spring is fixed at its outer end to the interior wall of the spring-box, (see Fig. 8,) and at the other end to the stationary plate $h$, serving as a bearing for the hand-shaft $e'$. A vertically-disposed bolt, $d^2$, is passed up through the circular inclosing-casing, and is encompassed by a spring, $d^3$, which normally holds it in a lowered position. This bolt $d^2$ is passed through an aperture in the thickened portion of a flat plate, $d''$, to which is pivotally secured the lower end of a spring-held pawl, $c'$, engaging the ratchet-wheel $e$. When the disengaging-bolt $d^2$ is pushed in in opposition to the spring $d^3$, the pawl-lever $d$ is raised, the bolt $d^2$ pushing against a projection, $d^4$, of said lever $d$. The operating-pawl $c$, as well as the stop-pawl $c'$, is thus moved out of engagement with the main ratchet-wheel $e$. The action of the spring therein then turns the said wheel and, by the engagement of the projection $e^3$ of the cam $e^2$, which is fixed to the wheel $e$, with the star-wheel pinion $g'$, the star-wheel $g$, so far that the arm $g^2$ on the pinion $g'$ strikes against a projecting pin, $e^4$, on the cam-disk $e^2$, and thereby stops the ratchet-wheels.

The ratchet-wheel $b$ is engaged by one end of a spring-held pawl, $g^5$, pivoted at its lower end to one end of a lever, $g^6$, which is engaged by a stud or pin, $g^7$, of the plate $d''$, as shown in Fig. 8. By this means the ratchet-wheel $b$ is held as against a reverse movement.

In order that during every full rotation of the cam $e^2$ the star-wheel $g$ shall turn only a distance equal to one tooth, a notched disk, $e^5$, is fixed upon the cam $e^2$. The notch in the disk $e^5$ is exactly long enough for a tooth of the star-wheel $g$ to pass through when the disk $e^5$ turns with the cam $e^2$. The notch then changes its position, so that the next tooth strikes against the periphery of the disk $e^5$. The division of the pinion $g'$ should be such as to admit of a maximum in duration of the hiring or of a maximum length of the drive, respectively, which maximum cannot be reached under ordinary circumstances. The arm $g^2$ on the star-wheel pinion $g'$ is stopped by a pin, $g^3$, Fig. 1.

It will be understood that the hand $e''$ is operated by the turning of the shaft $e'$, the pinion of which is engaged by the pawl $c$, operated by the lever $d$ and ratchet-wheel $b$. However, in order to obviate inconveniences, a minimum fare is usually fixed for public vehicles, which fares have to be paid in every case. The lever $d$ is therefore provided with a mechanism which allows it as soon as the vehicle is occupied by a passenger to at once turn the shaft carrying the hand so far that the latter indicates the minimum fare, but then stops until the vehicle has either passed over the equivalent distance or until the equivalent time has elapsed to allow it again after this to enter into action. As long as the vehicle is not used, the disengaging-bolt $d^2$ is pushed in against the pressure of its spring $d^3$, and being held by suitable means consequently keeps the pawl-lever $d$, against the projection $d^4$ of which the bolt $d^2$ bears, in a raised position. When a passenger enters the vehicle, the bolt $d^2$ will be released and descends by reason of the action of the spring $d^3$.

The release of the bolt $d^2$ can be effected by the hand of the driver, or automatically by suitable means. (Not shown.)

The lever $d$, acted upon by the spring $d^5$, follows the bolt, and its pawl $c$ engages with the ratchet-wheel $e$, and accordingly moves the shaft $e'$, carrying the hand $e''$, round the dial to indicate the minimum fare. At the same time the projection $d'$ of the pawl-lever $d$ has penetrated between the teeth of the main ratchet-wheel $b$, and is then gradually lifted by the displacement of the latter in correspondence with the distance passed over or with the time. Besides the pawl-lever $d$, there is an auxiliary lever, $x$, of exactly similar shape, only shorter, that does not reach to the disengaging-bolt $d^2$. The projection $x'$ of this auxiliary lever $x$, which is pressed down by a spring, $x^5$, engages with the main ratchet-wheel $b$, and consequently the auxiliary lever $x$ makes at first the same motion as the pawl-lever $d$.

On the auxiliary lever $x$, however, is arranged a disk, $x^2$, which tends to turn the spring $x^4$, acting upon the pin $x^3$. The spring $x^4$ bears against the pin $x^3$ of the disk $x^2$, normally holding the latter in the position shown in Fig. 8. A pin, $x^6$, fixed in the lever $x$, limits the angular movement of the disk $x^2$, in one side of which is formed a notch or groove, against the ends of which the pin $x^6$ is designed to come in contact to limit the movement of the disk, (see Figs. 8, 11, 12, and 13,) which are arranged upon the periphery of the disk $x^2$ almost diametrically opposite the notch or groove for the stop-pin $x^6$, and with these teeth a pawl, $k$, (see Figs. 8, 10, 11, 12, and 13,) pivoted upon the auxiliary lever $x$, and the arm $m$ of an angle-lever, $m\ n$, upon the casing of the apparatus engage. As the fulcrum of the angle-lever $m\ n$ is fixed, the disk $x^2$, when the auxiliary lever $x$ rises, is turned a little in opposition to the tendency of the spring $x^4$, so that the pawl $k$ can engage with the next tooth above in the disk. On the descent of the auxiliary lever $x$, the lever-arm $m$ engages with the next tooth, and thus the disk $x^2$ is gradually turned within the limits of the notch for the stop-pin $x^6$, Figs. 8, 10, 11, 12, and 13. In the motion of the disk $x^2$, however, a cam-sector, $l$, rigidly connected therewith, participates, the latter controlling the position of another angle-lever, $o\ p$, pivoted in the casing.

The arm $p$ of the angle-lever $o\ p$ is acted upon by the spring $p'$ and bears against the periphery of the cam-sector $l$. The lower projecting part of the latter enters first into action and keeps the lever $o\ p$ in such a position that a hook, $o'$, on the arm $o$ cannot engage with the pin $i$ on the pawl-lever $d$, Fig. 8; but as soon as the projection $x'$ passes a tooth of the main ratchet-wheel $b$ the disk $x^2$ is turned a distance equal to one tooth in a direction opposite to the direction of the arrow, Fig. 8, and the arm $p$ now passes into the recess of the cam-sector $l$, which has been turned likewise a little downward. The projection $o'$ then passes below the pin $i$ of the pawl-lever $d$, and thus stops the latter in the raised position, Fig. 10. This stoppage lasts as long as the arm $p$ rests in the notch of the cam-sector $l$, Figs. 10, 11, and 12. If the latter is, however, turned round so far that its upper projection presses back the arm $p$, the projection $o'$ releases the pawl-lever $d$, Fig. 13, which now swings up and down with the auxiliary lever $x$, and consequently by means of its pawl $c$ turns the ratchet-wheels $e$ and $f$, and with the former also the shaft $e'$, carrying the hand. When, consequently, the lever $d$ is raised by the disengaging-bolt $d^2$, the projection $m'$ (see Figs. 8, 10, and 13) of the lever-arm $m$ pushes back the pawl $k$, inasmuch as the angle-lever $m\ n$ is turned a little by the ascending pin $i$, that bears against the arm $n$. The spring $x^4$ then pushes back the cam-disk $x^2$ into its original position, Fig. 8.

Having now particularly described and ascertained the nature of my said invention and in what manner the same is to be performed, I declare that what I claim is—

1. The combination, in a fare-indicating apparatus for cabs and other vehicles, of the dial-plate, the ratchet-wheel $b$, the two pawl-levers $d$ and $x$, the disk $x^2$, the sector $l$, the indicating-hand, and the angle-levers $m\ n$ and $o\ p$, for the purpose of stopping automatically the movement of said hand after its first leap over a certain part of the divisions on the dial-plate to a point indicating the minimum fare, substantially as set forth.

2. In a fare-indicator for cabs or other vehicles, the two pawl-levers $d$ and $x$, the disk $x^2$, the sector $l$, the indicating-hand, the angle-levers $m\ n$ and $o\ p$, and the ratchet-wheels, in combination with the ratchet-wheel $e$, its spring, the spring-held disengaging-bolt having contact with said pawl-lever $d$, and the pawls $c\ c'$, substantially as shown and described, whereby a disengagement is effected after a certain distance or time equivalent to the minimum fare has been exceeded, as set forth.

3. In a fare-indicating apparatus, the combination, with the ratchet-wheels, the main shafts, and the pawl-levers $d\ x$, of the disk $e^2$, having the projection $e^3$, the notched disk $e^5$, the star-wheel $g$, and the pinion $g'$, having the pins, substantially as shown and described.

4. In a fare-indicating apparatus, the combination, with the ratchet-wheel $b$ and the pawl-lever $d$, of the auxiliary pawl-lever $x$, the disk $x^2$, having a notched and toothed edge, the sector $l$, having the groove, the pawl $k$, the angle-levers $m\ n$ and $o\ p$, the latter engaging a stop-pin, $i$, of the lever $d$, and the spring $x^4$, engaging a pin, $x^3$, substantially as shown and described.

In testimony that I claim the foregoing as my invention I have signed my name, in presence of two witnesses, this 23d day of April, 1887.

WILHELM FRIEDRICH NEDLER.

Witnesses:
 DIEDRICH PETERSEN,
 HERMANN GARTEN.